United States Patent
Sekine et al.

[11] Patent Number: 6,130,709
[45] Date of Patent: Oct. 10, 2000

[54] IMAGE PROCESSING APPARATUS FOR CORRECTING IMAGE VIBRATION

[75] Inventors: Masayoshi Sekine, Tokyo; Jun Tokumitsu, Sagamihara; Toshiaki Kondo, Atsugi, all of Japan

[73] Assignee: Canon Kabushiki Kaisha, Tokyo, Japan

[21] Appl. No.: 08/376,305

[22] Filed: Jan. 23, 1995

Related U.S. Application Data

[63] Continuation of application No. 08/110,339, Aug. 23, 1993, abandoned, which is a continuation of application No. 08/065,460, May 20, 1993, abandoned, which is a continuation of application No. 07/935,633, Aug. 24, 1992, abandoned, which is a continuation of application No. 07/636,572, Jan. 2, 1991, abandoned.

[30] Foreign Application Priority Data

Jan. 5, 1990 [JP] Japan ............................................. 2-255

[51] Int. Cl.⁷ .......................... H04N 5/228; H04N 5/225; H04N 5/262
[52] U.S. Cl. .......................... 348/208; 348/169; 348/240; 396/54; 396/55
[58] Field of Search ..................................... 348/207, 208, 348/699, 700, 143, 154, 155, 169, 240; 354/402, 406, 430; 359/196, 554, 555, 556, 557; 396/55, 53, 52, 54; H04N 5/232

[56] References Cited

U.S. PATENT DOCUMENTS

| | | | |
|---|---|---|---|
| 3,503,663 | 3/1970 | Cierva et al. | 350/500 |
| 4,717,958 | 1/1988 | Gal et al. | 358/222 |
| 4,788,596 | 11/1988 | Kawakami et al. | 358/222 |
| 5,012,270 | 4/1991 | Sekine et al. | 354/430 |
| 5,095,198 | 3/1992 | Nakazawa et al. | 250/201.8 |
| 5,170,255 | 12/1992 | Yamada et al. | 348/208 |
| 5,335,032 | 8/1994 | Onuki et al. | 354/195.1 |
| 5,469,210 | 11/1995 | Noguchi et al. | 348/208 |
| 5,561,498 | 10/1996 | Sekine | 396/53 |
| 5,568,190 | 10/1996 | Noguchi et al. | 348/208 |
| 5,771,069 | 6/1998 | Kobayashi | 348/208 |

FOREIGN PATENT DOCUMENTS

| | | | |
|---|---|---|---|
| 1178916 | 7/1989 | Japan | 350/500 |
| 682888A | 3/1994 | Japan | H04N 5/232 |

*Primary Examiner*—Tuan Ho
*Assistant Examiner*—Ngoc-Yen Vu
*Attorney, Agent, or Firm*—Robin, Blecker & Daley

[57] ABSTRACT

An image processing apparatus comprising a signal conversion circuit for changing input/output characteristics in accordance with a shift position of an image is arranged between a detection circuit for detecting a relative movement between a camera and an object to be photographed and an image shift circuit for shifting the image in accordance with a detection result of the detection circuit.

31 Claims, 3 Drawing Sheets

IMAGE PROCESSING APPARATUS FOR CORRECTING IMAGE VIBRATION

This is a continuation application under 37 CFR 1.62 of prior application Ser. No. 08/110,339 filed on Aug. 23, 1993 (aban.), which is a cont. of Ser. No. 08/065,460 filed on May 20, 1993 (aban.) which is a cont. of Ser. No. 07/935,633 filed on Aug. 24, 1992 (aban.) which is a cont. of Ser. No. 07/636,572 filed on Jan. 2, 1991 (aban.)

BACKGROUND OF THE INVENTION

1. Field of the Invention

The present invention relates to an image processing apparatus suitably used when an image pickup apparatus such as a TV camera or battery-driven still camera has a vibration-isolating function and an object tracking function.

2. Related Background Art

Arrangements for preventing vibrations of a camera by image signal processing are described in "Frame Vibration Correcting Apparatus", Technical Report of the Association of Television, Vol. 11, No. 3, 1987 and Japanese Laid-Open Patent Application No. 61-269572. In either arrangement, a vibration angle (inclination angle) of a camera is detected, and an image is electronically or optically shifted in a direction opposite to the vibration angle of the frame by an image shift means, thereby preventing the frame vibration. In the former arrangement, the image shift means shifts a read area of an image memory in accordance with a vibration detection result. In the latter arrangement, the image shift means optimally shifts the image by a variable vertex angle prism.

The conventional arrangements, however, have a common problem. The image shift means has the limit of shift amount. When a camera angle exceeds this limit, the image vibration cannot be properly corrected, and an output image is abruptly vibrated, resulting in an uncomfortable phenomenon.

SUMMARY OF THE INVENTION

The present invention has been made to solve the conventional problem described above, and has as the first object to provide an image processing apparatus free from an abrupt operation and capable of performing stable and natural image vibration correction.

It is the second object of the present invention to provide an image processing apparatus free from an unnatural movement against an image shift exceeding a correctable range of normal image shifts.

It is the third object of the present invention to provide an image processing apparatus for preventing an unnatural phenomenon for abruptly moving an image within a frame upon movement exceeding an image shift limit, by reducing an image shift amount when a shift comes close to the image shift limit.

In order to achieve the above objects of the present invention according to a preferred aspect of the present invention, there is provided an image processing apparatus comprising a detecting means for detecting a relative movement between a camera and an object, an image shift means for shifting a picked image, a control means for generating a control signal for the image shift means in accordance with a detection result of the detecting means, and a signal converting means, arranged between the detecting means and the image shift means, for changing input/output characteristics thereof in accordance with a shift position of the image shift means.

It is still another object of the present invention to provide an image processing apparatus wherein a signal converting means for controlling an image shift correction amount is arranged to adjust an image shift amount in accordance with whether a detected shift amount is close to a shift limit of the image shift means, so that when the detected shift amount comes close to the image shift limit, a shift amount is reduced; when the detected shift amount exceeds the image shift limit, an abrupt movement of an image within a frame is suppressed; and an unnatural movement of the image is prevented, and the image can be stabilized within the frame.

It is still another object of the present invention to provide an image processing apparatus capable of reducing a probability for causing an actual image shift amount to exceed its correction limit, thereby always obtaining a stable, comfortable image.

It is still another object of the present invention to provide an image vibration correction apparatus which employs the above image processing apparatus.

It is still another object of the present invention to provide a video camera which employs the above image processing apparatus.

The above and other objects, features, and advantages of the present invention will be apparent from the following detailed description in conjunction with the accompanying drawings.

DETAILED DESCRIPTION OF THE PREFERRED EMBODIMENTS

Preferred embodiments of the present invention will be described with reference to the accompanying drawings.

Figure 1:
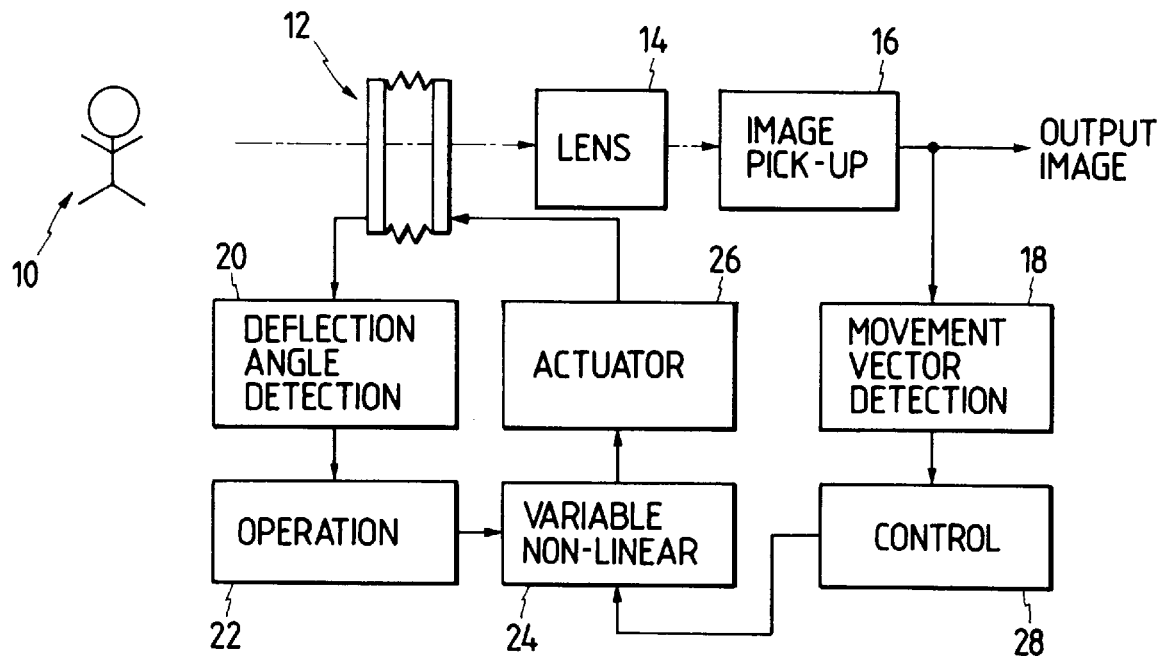
FIG. 1 is a block diagram showing an embodiment of the present invention.

FIG. 1 is a block diagram showing an arrangement of an image processing apparatus applied to an image vibration correction apparatus for a video camera. An object 10 is to be photographed by the video camera. A variable vertex angle prism 12 is obtained by sealing a silicone-based liquid between two parallel glass plates and corrects inclination of an optical axis by variably changing an angle of the two parallel glass plates. This image vibration correction apparatus also includes a photographic lens system 14, an image pick-up device 16 such as a CCD, and a movement vector detection circuit 18. Movement vector detection is described in U.S. Ser. No. 319,658 (filed on Mar. 6, 1989) and U.S. Ser. No. 403,455 (filed on Sep. 6, 1989). A deflection angle detection circuit 20 detects a deflection angle, i.e., an operation position, of the variable vertex angle prism 12. An operation circuit 22 processes a deflection angle detected by the deflection angle detection circuit 20 in accordance with a predetermined algorithm. A variable non-linear circuit 24 can externally control the non-linear input/output characteristics. An actuator 26 drives the variable vertex angle prism 12 in accordance with an output from the variable non-linear circuit 24. A control circuit 28 supplies a control signal to the actuator 26 in accordance with an image movement (i.e., vibration information) detected by the movement vector detection circuit 18. The non-linear characteristics of the variable non-linear circuit 24 are controlled in accordance with an output from the operation circuit 22, an output from the control circuit 28 is non-linearly processed by the non-linear circuit 24, and the processed signal is applied to the actuator 26.

The deflection angle detection circuit 20 detects an inclination angle of the two parallel glass plates, and a detection method of the circuit 20 is not limited to a specific one. The deflection angle detection circuit can comprise a position detection element (PSD) or a Hall element. The operation circuit 22 can comprise an analog circuit including a microcomputer and an operational amplifier. The variable non-linear circuit 24 may comprise an analog circuit including operational amplifiers and diodes (to be described later). Alternatively, the variable non-linear circuit 24 may be realized by software using a microcomputer.

In this embodiment, when an input to the actuator 26 is zero, a deflection angle of the variable vertex angle prism 12 is set to be zero (i.e., two glass plates are parallel to each other). A positive or negative voltage centered on the zero volts is applied to the actuator 26. This also applies to the output from the detection circuit 20.

In a basic operation of the arrangement shown in FIG. 1, an image movement, i.e., a camera vibration, is detected by the movement vector detection circuit 18, the control circuit 28 outputs a control signal to cancel this camera vibration, and the control signal is non-linearly processed by the non-linear circuit 24 and applied to the actuator 26. The vertex angle of the variable vertex angle prism 12 is controlled to be changed, and therefore an output image free from any vibration can be obtained.

In this embodiment, a unique effect (to be described later) can be obtained by a variable vertex angle prism control loop consisting of the deflection angle detection circuit 20, the operation circuit 22, the variable non-linear circuit 24, and the actuator 26. That is, since the deflection angle detection circuit 20 outputs a voltage value corresponding to a deflection angle of the variable vertex angle prism 12, the present deflection angle and the margin to the movable limit of the variable vertex angle prism can be detected from an output voltage from the deflection angle detection circuit 20. When an output from the deflection detection circuit 20 is almost zero, i.e., when a vibration correction amount is small, since a sufficient margin is assured for an operable range of the variable vertex angle prism, the input/output characteristics of the variable non-linear circuit 24 are set to be normal linear characteristics. However, when the output from the deflection angle detection circuit 20 comes close to the deflection angle limit, i.e., when the variable vertex angle prism comes close to the limit of its operable range, the input/output characteristics of the variable non-linear circuit 24 are set to be nonlinear characteristics. The operation circuit 22 is arranged to generate control signals to control the input/output characteristics of the variable non-linear circuit 24 as described above.

Figure 2:
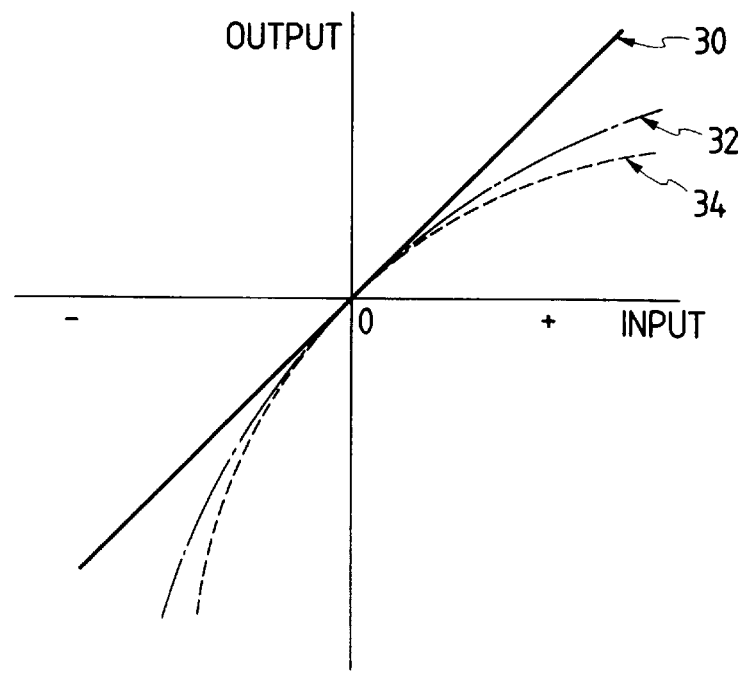
FIG. 2 is a graph showing input/output characteristics of a variable non-linear circuit 24 shown in FIG. 1.

FIG. 2 is a graph showing input/output characteristics of the variable non-linear circuit 24. An input, i.e., a vibration correction amount output from the control circuit 28 in correspondence with a movement (i.e., vibration) amount detected by the movement vector detection circuit 18 is plotted along the abscissa, and an output represents a signal associated with a driving amount of the actuator. In FIG. 2, the variable vertex angle prism 12 has already been shifted to a positive side. When its shift amount is further corrected to the positive side, the deflection angle reaches its limit. An operating state, i.e., inclination, of the variable vertex angle prism 12 is input in accordance with deflection angle information output from the operation circuit 22, so that the driving characteristics of the variable vertex angle prism are controlled. When the variable vertex angle prism 12 is set in an almost parallel state, a characteristic curve 30 is obtained. When the variable vertex angle prism 12 is slightly deflected, a characteristic curve 32 is obtained. When the variable vertex angle prism 12 is largely deflected, a characteristic curve 34 is obtained. That is, when the deflection angle of the prism is increased, a prism driving signal is compressed, so that an actual prism driving amount is suppressed to be small. Assume that the variable vertex angle prism 12 has a given deflection angle. When an output from the movement vector detection circuit 18 instructs to drive the actuator 26 in a direction to increase the given deflection angle (i.e., in a direction to come close to the deflection angle limit), the actuator 26 is weakly driven. To the contrary, when the output from the movement vector detection circuit 18 instructs to drive the actuator 26 in a direction to reduce the given deflection angle, the actuator 26 is strongly driven.

In this manner, the input/output characteristics of the variable non-linear circuit 24 are controlled in accordance with the deflection angle of the variable vertex angle prism 12. A probability for causing the variable vertex angle prism to reach its deflection angle limit is reduced. Therefore, an undesirable conventional phenomenon for abruptly vibrating an image in a vibration amount exceeding the dynamic range of the image vibration correction system tends not to occur, and a comfortable, stable, natural image can always be obtained.

Figure 3:
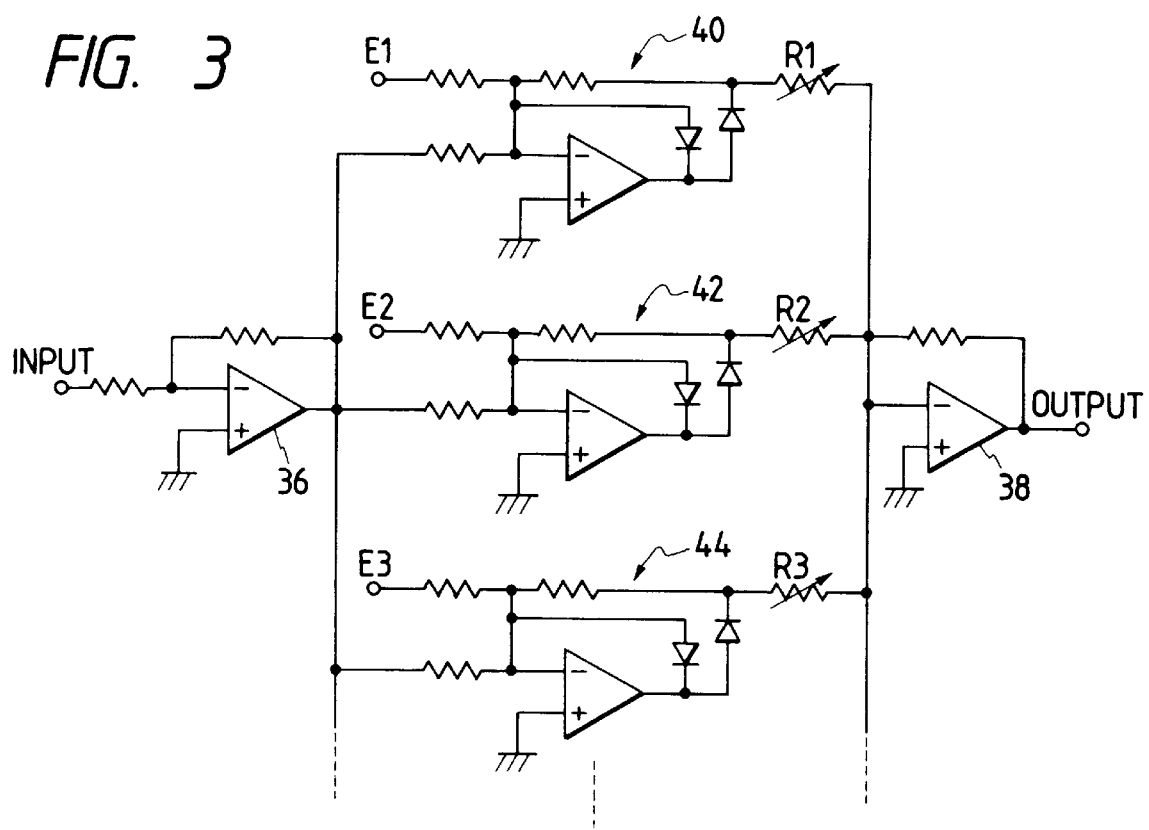
FIG. 3 is a circuit diagram showing the variable non-linear circuit 24 shown in FIG. 1.
Figure 4:
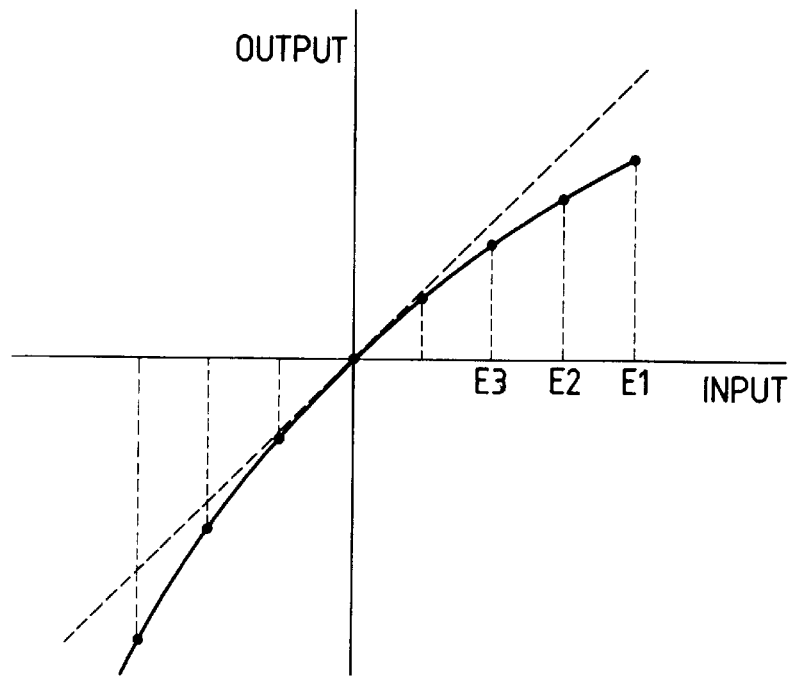
FIG. 4 is a graph showing input/output characteristics of the circuit shown in FIG. 3.

FIG. 3 is a circuit diagram showing an arrangement of the variable non-linear circuit 24. This circuit has polygonal characteristics by ideal diodes. That is, the circuit comprises buffer amplifiers 36 and 38, and ideal diode circuits 40, 42, 44, . . . . FIG. 4 shows input/output characteristics of the circuit shown in FIG. 3. Points of a polygonal line in FIG. 4 are determined by control voltages E1, E2, E3, . . . . Gradients between the adjacent points are determined by resistances of resistors R1, R2, R3 . . . . Therefore, by externally controlling the voltages E1, E2, E3, . . . and the resistances of the resistors R1, R2, R3, . . . , arbitrary nonlinear input/output characteristics can be obtained.

Figure 5:
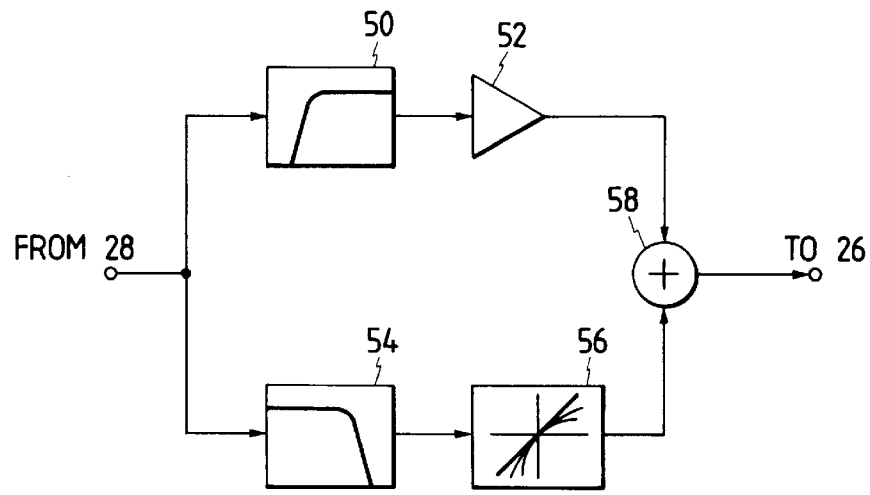
FIG. 5 is a block diagram showing a modification of the variable non-linear circuit 24.

In the embodiment shown in FIG. 1, a given non-linear characteristic curve is used at all frequencies. The embodiment shown in FIG. 1 can be improved as follows. In the arrangement of FIG. 1, a control gain is fluctuated in a frequency band (0.5 Hz to 3 Hz) corresponding to most frequent occurrence of camera vibrations. This indicates that a vibration correction amount is not insufficient or an unstable operation is performed when the variable vertex angle prism 12 is set at an almost parallel state. In order to solve this problem, a circuit arrangement shown in FIG. 5 is used in place of the variable non-linear circuit 24 in FIG. 1. In the circuit of FIG. 5, different non-linear characteristic curves are used in correspondence with frequency components of control signals output from the control circuit 28.

A circuit in FIG. 5 comprises a high-pass filter (HPF) 50, a linear amplifier 52 having linear input/output characteristics, a low-pass filter (LPF) 54, a variable non-linear amplifier 56 whose input/output characteristics are variable, and an adder 58. The HPF 50 and the LPF 54 are set at a cutoff frequency crossing a lower boundary (e.g., 0.5 Hz) of the frequency band corresponding to the most frequent occurrence of camera vibrations. An input signal having a frequency of 0.5 Hz or more is applied to the linear amplifier 52, while an input signal having a frequency of 0.5 Hz or less is applied to the variable non-linear amplifier 56. Outputs from the amplifiers 52 and 54 are added by the adder 58, and a sum is output. That is, of all camera vibration frequency components, frequency components whose vibration-isolating effect are important are normally operated, and the variable vertex angle prism 12 is returned to the parallel state at frequencies lower than those of the above frequency components.

With the above arrangement, as described above, an unstable operation of the variable vertex angle prism 12 and an insufficient vibration correction amount at frequencies except for frequencies corresponding to the camera vibrations can be prevented. In addition, since the variable vertex angle prism 12 comes close to its limit angle, the shift amplitude is suppressed. Therefore, the phenomenon for causing the detected shift amount to exceed the shift limit can be suppressed, and a stable image without any vibration can always be obtained.

A plurality of channels are arranged in the LPF 54 and the variable non-linear amplifier 56, and a plurality of band-pass filters having different band-pass ranges can be used in place of the LPF 54 to finely perform processing, thereby obtaining excellent performance.

Figure 6:
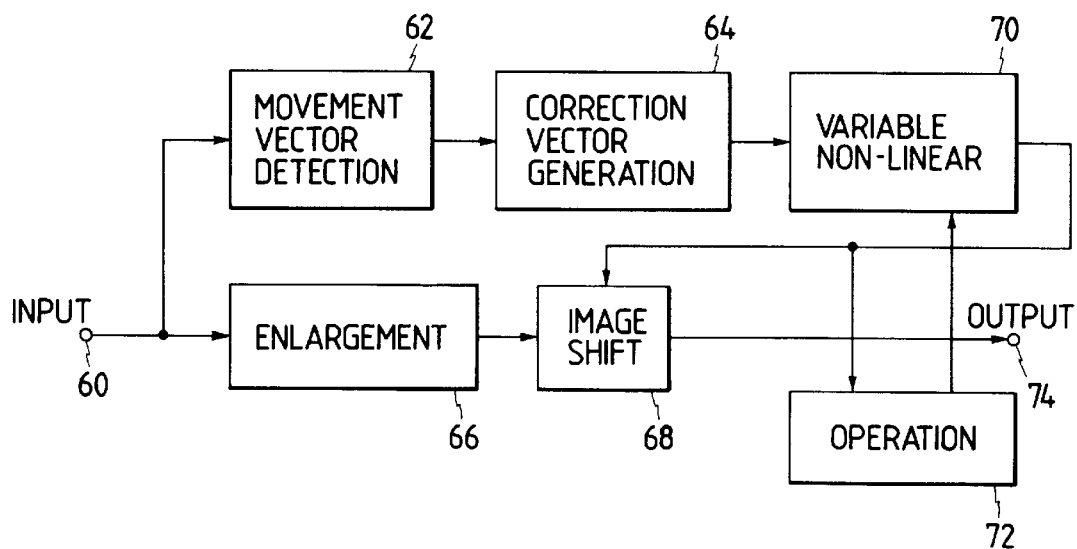
FIG. 6 is a block diagram showing another embodiment according to an electronic shift scheme.

The above embodiment has been described in association with a method of optically correcting a camera vibration by using a variable vertex angle prism. FIG. 6 is a block diagram showing an arrangement for electronically shifting an image to correct a vibration according to another embodiment of the present invention. A video signal having a frame vibration is input to an input terminal 60. This arrangement includes a movement vector detection circuit 62 for detecting a movement amount of an image within the frame and detecting a movement vector, a correction vector generation circuit 64 for generating a correction vector for correcting its movement on the basis of the movement vector detected by the movement vector detection circuit 62, an enlargement processing circuit 66 for enlarging the video signal input to the input terminal 60, an image shift circuit 68 for shifting the image on the basis of the correction vector to correct the vibration of the image, a non-linear circuit 70 for supplying non-linear input/output characteristics to the correction vector to variably set non-linear characteristics, an operation circuit 72 corresponding to the operation circuit 22 in FIG. 1, and an output terminal 74 for outputting a vibration-corrected video signal.

Referring to FIG. 6, the movement vector detection circuit 62 detects a movement vector from the video signal input to the input terminal 60 on the basis of a change in image information. The correction vector generation circuit 64 generates a correction vector representing a magnitude of an image shift and its direction to correct the movement vector in accordance with the movement vector corresponding to an image movement amount and detected by the movement vector detection circuit 62. The image shift amount is represented by a movement or correction vector and represents a shift of an image read address from that of the real image. The correction vector is non-linearly transformed by the variable non-linear circuit 70 and is applied to the image shift circuit 68. The operation circuit 72 performs the same operation as in the operation circuit 22 in accordance with an output from the variable nonlinear circuit 70, thereby changing the input/output characteristics of the variable non-linear circuit 70. The image shift amount can be non-linearly suppressed in accordance with a distance to the image shift limit point. As in the first embodiment, the image shift amount is adjusted so as to prevent an unnatural movement near the limit point.

On the other hand, the enlargement processing circuit 66 enlarges the video signal input to the input terminal 60. The image shift circuit 68 shifts the enlarged image from the enlargement processing circuit 66 in accordance with the non-linearly transformed correction vector. Therefore, the vibration-corrected video signal appears at the output terminal 74.

The above description has exemplified prevention of a camera vibration. However, the present invention is also applicable to an automatic object tracking apparatus for tracking a moving object so as to locate the target moving object at the center of the frame.

As can be easily understood from the above description, according to the present invention, a probability for causing an image shift amount to exceed an image shift correction limit can be reduced, and a stable, comfortable image can be obtained.

What is claimed is:

1. An image processing apparatus including:
    A) means for detecting a movement of an image;
    B) means for correcting the movement of the image on the basis of an output from said detecting means; and
    C) control means for adaptively changing a unit movement correction amount of said movement correcting means to the movement detected by said detection means, according to a correcting position of said correcting means relative to an end of a movement correction range of said correcting means.

2. An apparatus according to claim 1, wherein said detecting means detects a movement vector of the image from an image pick-up signal output from an image pick-up means.

3. An apparatus according to claim 1, wherein said correcting means comprises a variable vertex angle prism driven in accordance with the output from said detecting means.

4. An apparatus according to claim 1, wherein said correcting means corrects the movement by shifting the image according to the output of the detecting means.

5. An apparatus according to claim 1, wherein said control means non-linearly controls a relationship between an image movement amount detected by said detecting means and the correction amount of said correcting means.

6. An apparatus according to claim 5, wherein said control means non-linearly compresses the correction amount for the image movement amount when an operation amount of said correcting means is increased.

7. An apparatus according to claim 6, wherein said control means includes a plurality of ideal diodes and voltage regulating means.

8. An apparatus according to claim 6, wherein said control means is constituted by microcomputer software.

9. An image vibration detecting apparatus including:
    A) image pick-up means;
    B) movement detecting means for detecting a movement of an image from an image pick-up signal output from said image pick-up means;
    C) means for correcting the movement of the image on the basis of an output from said movement detecting means;

D) first control means arranged between said detecting means and said correcting means for controlling a correction amount of said correcting means in accordance with an operating state of said correcting means; and E) second control means for controlling an operation of said first control means in accordance with a frequency of the movement of the image.

10. An apparatus according to claim 9, wherein said movement detecting means detects a movement vector in accordance with a change in the image.

11. An apparatus according to claim 10, wherein said correcting means electronically cancels the movement of the image by shifting the image to cancel the movement vector.

12. An apparatus according to claim 10, wherein said correcting means optically cancels the movement of the image on the basis of the movement vector.

13. An apparatus according to claim 12, wherein said second control means detects a movement amount in a specific frequency range of the image and supplies the detected movement amount to said first control means.

14. An apparatus according to claim 13, wherein said second control means includes a low-pass filter for extracting a frequency component corresponding to a camera vibration.

15. An apparatus according to claim 9, wherein said first control means non-linearly controls a relationship between an image movement amount detected by said detecting means and the correction amount of said correcting means in accordance with a driving state of the correction amount.

16. An apparatus according to claim 15, wherein said correcting means is a variable vertex angle prism.

17. An apparatus according to claim 15, wherein said correcting means corrects the movement by shifting the image according to the output of said movement detecting means.

18. A video camera apparatus including:

A) image pickup means;

B) means for detecting a movement of an image received into said image pickup means;

C) means for correcting the movement of the image; and

D) control means for adaptively changing a unit correction amount of said correcting means to the image movement detected by said detection means, according to a correcting position of said correcting means relative to an end of a movement correction range of said correcting means.

19. An apparatus according to claim 18, wherein said control means non-linearly controls driving characteristics of said correcting means on the basis of an operating state of said correcting means.

20. An apparatus according to claim 19, wherein said control means has non-linear characteristics to reduce the correction amount when said correcting means is closer to a movement correctable range limit thereof.

21. An apparatus according to claim 18, wherein said correcting means is a variable vertex angle prism.

22. An apparatus according to claim 18, wherein said correcting means corrects the movement by shifting the image according to an output of the detecting means.

23. A camera apparatus including:

A) means for detecting a movement between an object and a camera body;

B) means for correcting the movement on the basis of an output from said detecting means; and C) control means for restraining a unit correction amount of said correcting means to the movement detected by said detection means, according to a correcting position of said correcting means relative to an end of a movement correction range of said correcting means on the basis of a predetermined non-linear characteristic.

24. An apparatus according to claim 23, wherein said control means non-linearly controls a relationship between an image movement amount detected by said detecting means and the correction amount of said correcting means.

25. An apparatus according to claim 23, wherein said control means reduces movement correction amount operated, based on the output of said detecting means, when said correcting means approaches the end of the correction range thereof.

26. An apparatus according to claim 23, wherein said correcting means is means for performing optical correction.

27. An apparatus according to claim 23, wherein said correcting means performs correction using image processing.

28. A video camera apparatus including:

A) image input means;

B) means for detecting a movement of an image received into said image input means;

C) means for correcting the movement of the image; and

D) control means for adaptively restraining a unit movement correction amount of said movement correcting means to the movement detected by said detection means, according to a correcting position of said correcting means relative to an end of a movement correction range of said correcting means.

29. An apparatus according to claim 28, wherein said correcting means is a variable vertex angle prism whose optical axis can be changed to correct vibration.

30. An apparatus according to claim 28, wherein said correcting means corrects the movement by shifting the image according to an output of the detecting means.

31. An apparatus according to claim 27, wherein said control means performs non-linear control so as to reduce correction amount when said correcting means is near to the end of a correction range thereof.

* * * * *

UNITED STATES PATENT AND TRADEMARK OFFICE
CERTIFICATE OF CORRECTION

PATENT NO. : 6,130,709
DATED : October 10, 1999
INVENTOR(S) : Masayoshi Sekine et al.

Page 1 of 1

It is certified that error appears in the above-identified patent and that said Letters Patent is hereby corrected as shown below:

Column 8,
Line 51, delete "claim 27" and insert -- claim 28 --.

Signed and Sealed this

Eighteenth Day of December, 2001

Attest:

Attesting Officer

JAMES E. ROGAN
Director of the United States Patent and Trademark Office